3,664,687
VEHICLE TOW BAR
Thomas O. Nutt, Jr., and Thomas O. Nutt III, both of 3536 Queen Anne Drive, Fairfax, Va. 22030
Filed Jan. 21, 1970, Ser. No. 4,589
Int. Cl. B62d 53/00
U.S. Cl. 280—491         6 Claims

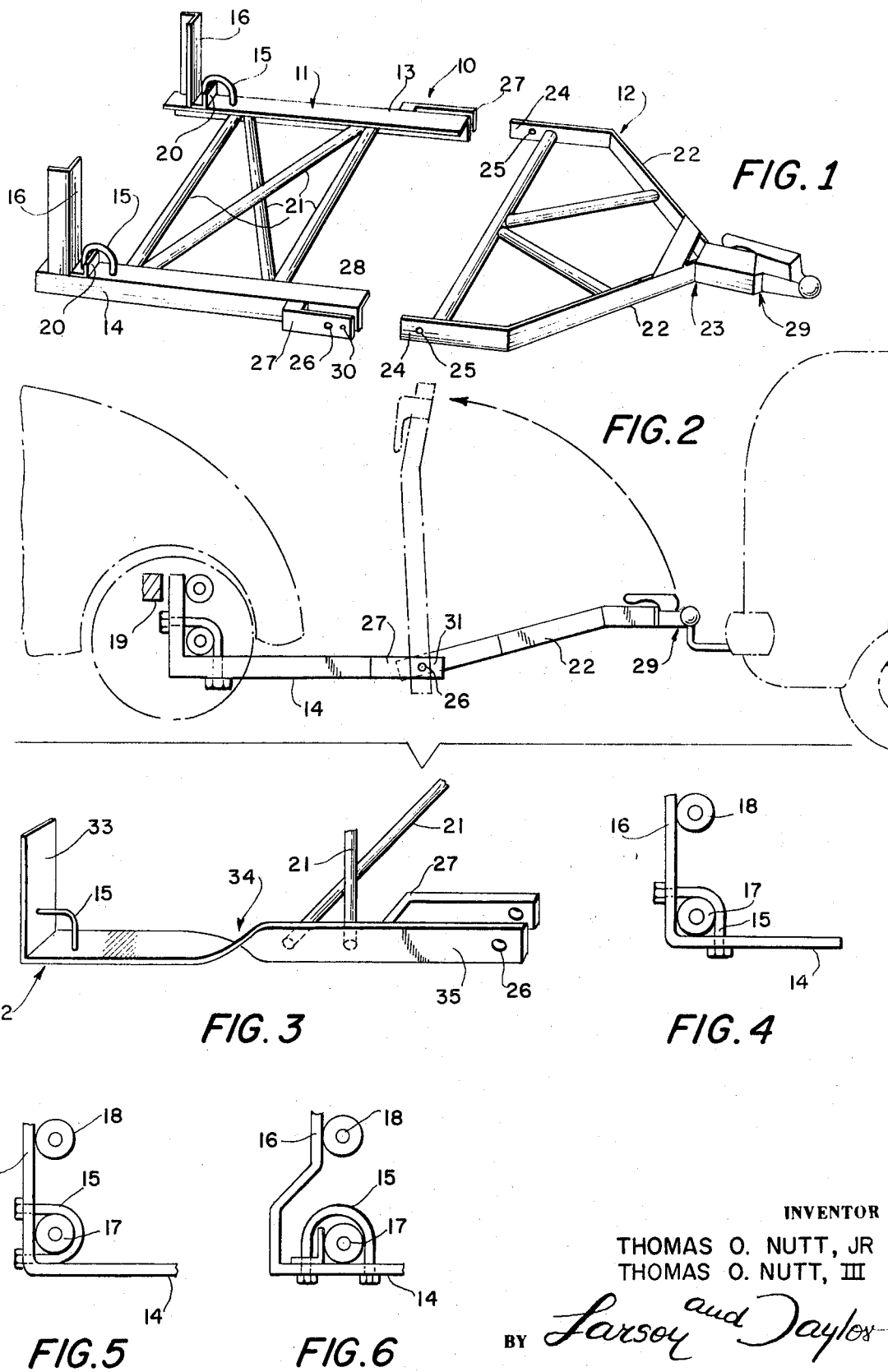

ABSTRACT OF THE DISCLOSURE

A tow bar is provided for towing vehicles which have upper and lower front axles but which do not have a frame or a bumper to which a tow bar could be secured. A tow bar according to the invention comprises a generally horizontal rigid platform provided at the rear end with two clamp members for holding and encircling the lower front axle of the towed vehicle. The rear end of the platform is also provided with two upstanding members which engage the upper axle and prevent the platform from rotating downwardly about the lower axle. The forward end of the platform is provided with means to connect the platform to a towing vehicle. The connecting means conveniently comprises an A-frame, the rear, wider, end of which is secured to the forward end of the platform and the forward end of which is connectable to the towing vehicle.

BACKGROUND OF THE INVENTION

This invention relates tow bars. More particularly, the invention relates to a tow bar for a vehicle having upper and lower front axles. Still more particularly, the invention relates to such vehicles which have neither a frame nor front bumper to which a conventional tow bar can be secured.

In my prior co-pending application Ser. No. 759,568, filed Sept. 13, 1968, now Pat. No. 3,501,169, I have disclosed a tow bar suitable for towing a vheicle having no frame. An example of this type of vehicle is the Volkswagen "Beetle." A vehicle of this type does not include a frame to which a conventional tow bar can be secured. The tow bar of my prior application provided a platform which was connectable to the front axle and to the front bumper of the vehicle. Thus, there was provided a tow bar which is suitable for towing a vehicle not provided with a frame, which tow bar positivley secured to the vehicle such that no damage results to the towed vehicle and so that the towed vehicle does not sway from side to side during the towing operation. While the device of my prior application is suitable for vehicles of this type, there have now appeared many vehicles of the "Beetle" type which do not have a front bumper. A typical example of this type of vehicle is the "dune buggy." These vehicles are made from the Volkswagen "Beetle" chassis and include upper and lower front axles but do not include either a frame or a bumper to which a tow bar can be secured.

It is an object of the present invention to provide a tow bar for towing vehicles having upper and lower front axles. It is a further object of the invention to provide a device for "frameless" vehicles of this type. It is still a further object of the present invention to provide a tow bar for vehicles of this type which do not have a front bumper.

SUMMARY OF THE INVENTION

The foregoing and other objects which will be apparent to those having ordinary skill in the art are achieved according to the present invention by providing a tow bar for towing a vehicle having upper and lower front axles comprising a rigid bed portion, axle holding means on said bed portion for encircling and holding the lower front axle of the towed vehicle, means on said bed portion for engaging the upper front axle of the vehicle to prevent rotation of said bed portion about said lower axle downwardly away from said vehicle, and means for connecting the bed portion to a towing vehicle.

DETAILED DESCRIPTION

Preferred embodiments of the invention are described in the following detailed description including the drawings in which:

FIG. 1 is a perspective view of a tow bar according to the present invention;

FIG. 2 is a diagrammatic elevation of the tow bar of FIG. 1 in use;

FIG. 3 is a perspective view of an embodiment of a side frame member of a tow bar according to the invention; and FIGS. 4–6 are diagrammatic views showing alternative arrangements for a U-shaped clamp member utilized to secure a tow bar according to the present invention to the lower front axle of the towed vehicle.

With reference to FIG. 1, a tow bar 10 includes a rigid bed portion 11 and a connecting means 12 for connecting the rigid bed portion to the towing vehicle. The rigid bed portion includes two horizontally extending side frame members 13 and 14 extending generally longitudinally of the rigid bed portion. The rigid bed portion is horizontally disposed when used for towing a vehicle and the expressions "horizontal," "vertical" and the like will be used with reference to the rigid bed portion being disposed in its normal horizontal position. The frame members 13 and 14 are provided at the rear end thereof with clamp members 15 utilized to engage the lower front axle of the vehicle being towed. Each clamp member comprises an elongate member extending generally longitudinally of the bed portion in a fore and aft direction. The ends of each elongate member are secured, such as by a nut, to the tow bar thus providing an aperture to encircle the lower front axle. Each clamp member includes means, such as a nut, for clamping the member on the axle to securely hold same. In use, the tow bar is oriented with the connecting means 12 extending generally forward of the towed vehicle and the expression "forward end" is used to describe that end of the rigid bed portion to which the connecting means is secured. The other end of the rigid bed portion including clamp member 15 is referred to herein as the rear end of the tow bar. In addition to clamp members 15, the rear end of the rigid bed portion of the tow bar is provided with two upstanding members 16 to engage the upper front axle of the towed vehicle to prevent rotation downwardly of the rigid bed portion about the lower front axle. This relationship is most easily seen in FIG. 2 and in FIGS. 4–6. The clamp member 15 encircles and holds the lower axle 17 and the weight of the rigid platform causes vertically upstanding member 16 to engage the upper axle 18. The member 16 thus holds the rigid bed portion 10 in a substantially horizontal position during towing of the vehicle. Members 16 also serve to hold the towed vehicle securely and to prevent swaying during towing. If desired, the vertically upstanding member 16 can be secured to upper axle 18 by means of a clamp member, such as a U bolt. However, this is not necessary. Furthermore, the chassis of the vehicle usually includes a portion 19 closely spaced rearwardly of upper axle 18 which limits the rearward motion of vertically upstanding member 16. Members 16 can be sized to a close fit between chassis portion 19 and and upper axle 18 to assist clamp members 15 in holding the tow bar for securely towing the vehicle.

The rear end of side frame members 13 and 14 can also be provided with a stop 20 which is useful to prevent the application of large forces against the U-shaped clamp member during acceleration. A stop 20 is particularly suitable for this purpose where the clamp member is U-shaped and provided as shown in FIG. 1 and FIG. 6. In this instance, both legs of the U-shaped member extend through the side frame member 14. In other embodiments, such as shown in FIGS. 4 and 5, there is no leg of the clamp member located directly behind the lower axle 17. Accordingly, the forces during acceleration would be applied to the upstanding member 16. In this instance, the upstanding member 16 can be of robust construction thus obviating the necessity of a stop 20. However, a stop can conveniently be provided in these embodiments to reduce the forces due to acceleration on the upstanding member 16. Similarly, a further stop may be provided in any of the embodiments forwardly of the axle 17 in order to prevent undue forces being applied against a leg of a clamp member during deceleration.

The side frame members 13 and 14 are made rigid by means of any suitable connecting means such as braces 21 extending generally transversely of the rigid bed portion. While braces are preferred, the rigid bed may, of course, comprise a single sheet of metal. In either event, the bed is preferably integral but may be provided with conventional means for adjustment of the width thereof. For example, braces 21 may be telescoping and pivotally secured to the side frame members. Alternatively, or in addition, the bed portion may be provided with means, such as apertures, to secure clamp members 15 at various locations transversely of the tow bar to accommodate various vehicles having lower front axles of various widths.

The rigid bed portion is connected to the towing vehicle by any suitable connecting means such as the A-frame member 12 shown in the drawings. The A-frame member includes side frame members 22 extending outwardly rearwardly from the narrow front portion 23 of the A-frame member. The rear portion 24 of each of the side frame members is provided with a suitable means for connecting the A-frame member to the rigid bed portion 10. In a preferred embodiment, the side members of the A-frame are each provided with an aperture 25 to receive a bolt extending through apertures 26 provided in the forward end of the rigid bed portion 11. The forward end of bed portion 11 is conveniently provided with a pair of side brackets 27 having apertures 26 located therein, said side brackets being connected to the side rails 13 and 14 of the rigid bed portion by any suitable means such as a weld. A recess 28 is formed between each side bracket 27 and its corresponding side frame member 13 or 14. A conventional trailer hitch mechanism 29 is located at the forward end of the the front frame 12 for connecting the tow bar apparatus to the hitch ball of a towing vehicle.

Side bracket 27 may also include a second aperture 30 through which a pin 31 may be inserted for locking the front frame member 11 in the vertical position as shown most clearly in FIG. 2.

In operation, the upstanding members 16 of the rigid bed portion are inserted upwardly behind the upper and lower front axles of the vehicle to be towed. U-shaped clamp members 15, which may comprise U bolts, are then encircled about the lower front axle and firmly secured thereto. The clamping members 15 are, of course, aligned transversely of the rigid bed portion and the tow bar is centered with respect to the towed vehicle and extends forwardly thereof when the rigid bed portion is in place. The A-frame member is then positioned in its operating position as shown in FIG. 2 and the conventional hitch is secured to the towing vehicle. Due to the action of the upstanding members 16 in engagement with the upper axle 18, and due to the fact that the U-shaped clamp members encircle and securely hold the lower front axle, the vehicle can be towed with a minimum amount of sway. Thus, there is provided a tow bar for towing over long distances, vehicles which have neither a frame nor a front bumper to which a tow bar is secured.

The side frame members 13 and 14 shown in FIG. 1 are fabricated from angle iron. An alternative arrangement is shown in FIG. 3 wherein the side frame members are fabricated from a flat bar. The flat bar is angled at 32 to provide a vertically upstanding member 33 corresponding to member 16 shown in FIG. 1. A clamp member 15 is provided in the usual manner adjacent bend 32. The flat bar is twisted at 34 to form a vertically upstanding portion 35 at the forward end of the side frame member. The side frame member can be readily provided with conventional bracing 21 and side brackets 27 as described in connection with FIGS. 1 and 2.

Although the invention has been described in considerable detail with respect to preferred embodiments thereof, it should be apparent that the invention is capable of numerous modifications and variations apparent to those skilled in the art.

What is claimed is:

1. A tow bar for towing a vehicle having upper and lower front axles comprising rigid bed portion including first and second horizontal frame members extending horizontally along opposite sides of said bed, a generally vertically extending arm extending upwardly at the end of each of said frame members and engageable with the upper front axle of the towed vehicle for preventing rotation of said bed portion about said lower axle downwardly away from said vehicle, axle holding means for encircling and holding the lower front axle of the towed vehicle comprising an elongate clamp member on each frame member connected to the bed and providing an aperture for encircling the lower front axle of the towed vehicle, said clamp member being located adjacent the angle formed between said frame member and said generally vertically extending arm, and means for connecting the bed portion to a towing vehicle.

2. A tow bar according to claim 1, wherein said clamp member comprises a U bolt having both legs secured to said frame member.

3. A tow bar according to claim 1, wherein said clamp member comprises a U bolt having both legs secured to said vertical arm member.

4. A tow bar according to claim 1, wherein said clamp member comprises an elongate bolt having a first leg secured to said frame member and a second leg secured to said vertical arm member.

5. A tow bar for towing a vehicle having upper and lower front axles comprising a rigid bed portion, axle holding means on said bed portion for encircling and holding the lower front axle of the towed vehicle means on said bed portion for engaging the upper front axle of the vehicle to prevent rotation of said bed portion about said lower axle downwardly away from said vehicle, and means for connecting the bed portion to a towing vehicle, said connecting means comprising an A-frame member, the wider end thereof being pivotally connected to the forward end of said rigid bed portion, and the narrower end thereof including means to connect the towing bar to the towing vehicle.

6. A tow bar according to claim 5, wherein said bed portion includes means for holding said A-frame member in a vertical position with respect to the horizontal frame members.

References Cited

UNITED STATES PATENTS

| | | | |
|---|---|---|---|
| 3,154,204 | 10/1964 | La Venture | 280—402 X |
| 2,555,663 | 6/1951 | Schouboe | 214—86 A |
| 3,410,579 | 11/1968 | Jenson | 280—491 B |
| 3,501,169 | 3/1970 | Nutt | 280—491 |

LEO FRIAGLIA, Primary Examiner

U.S. Cl. X.R.

214—86 A; 280—402